Figure 1:
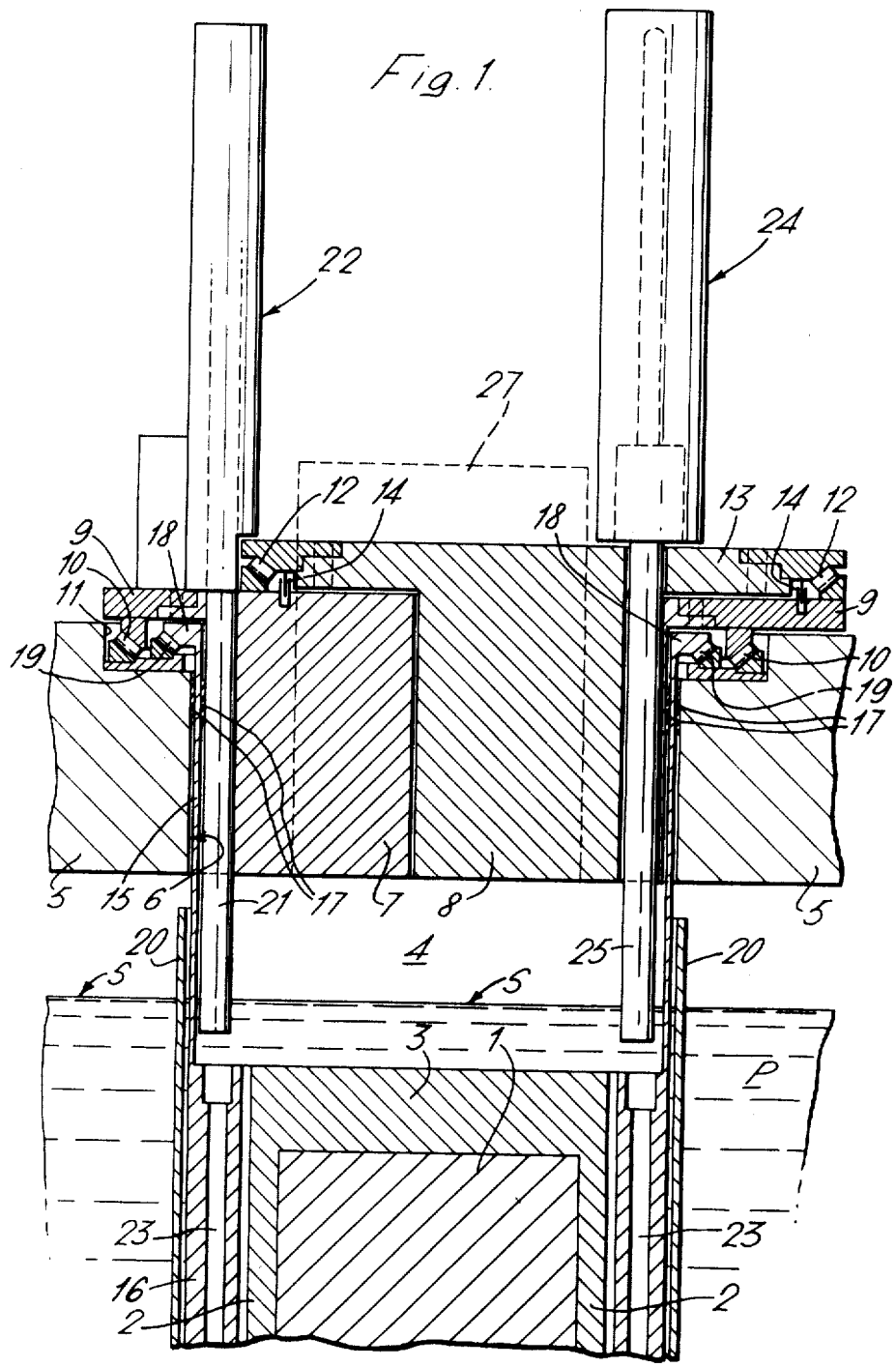

United States Patent
Barker

[15] 3,635,792
[45] Jan. 18, 1972

[54] REFUELLING MEANS FOR NUCLEAR REACTORS

[72] Inventor: Allan Barker, Chester, England

[73] Assignee: United Kingdom Atomic Energy Authority, London, England

[22] Filed: July 22, 1968

[21] Appl. No.: 746,429

[30] Foreign Application Priority Data

Aug. 16, 1967 Great Britain.....................37,819/67

[52] U.S. Cl.................................................176/32, 176/40
[51] Int. Cl............................................................G21c 19/18
[58] Field of Search......................................176/40, 28–32

[56] References Cited

UNITED STATES PATENTS 3,143,226  8/1964  Cagin et al............................176/30 X
3,169,117  2/1965  Dickinson et al.....................176/40 X
3,354,040  11/1967  Frame et al..........................176/40 X

FOREIGN PATENTS OR APPLICATIONS 216,210  6/1956  Australia................................176/32

Primary Examiner—Reuben Epstein
Attorney—Larson, Taylor and Hinds

[57] ABSTRACT

A fast reactor of the type which has its core submerged in a pool of liquid coolant contained in a vessel, is provided with an annular store for fuel elements, the store also being submerged in said pool of liquid coolant and being disposed concentrically relative to said reactor core. Fuel-handling means are provided for moving fuel elements to said store and from thence to said core, and vice versa. The annular store is preferably rotatable relative to a fixed part of the reactor installation and enables unloading and loading of said store to be undertaken while the reactor is operating. The fast reactor is conveniently liquid-metal-cooled.

6 Claims, 2 Drawing Figures

REFUELLING MEANS FOR NUCLEAR REACTORS

This invention relates to refuelling arrangements for nuclear reactors, particularly fast nuclear reactors.

The power density in a fast reactor core is necessarily high, and the movement of even small quantities of fuel while a fast reactor is on power can give rise to difficult problems of control of reactivity. Furthermore the heat rating of individual fuel subassemblies constituting the core is very high, and a fuel subassembly withdrawn from the core during even low-power operation would necessitate a forced flow of coolant through the subassembly both during discharge and for a considerable period thereafter. The philosophy adopted for refuelling current designs of fast reactors has therefore involved discharge of fuel during reactor shutdown, and storing such discharged fuel beneath a pool of liquid coolant, e.g., sodium, in the reactor for a substantial period to allow radioactive decay before withdrawing the fuel out of the reactor tank and transferring it to a breakdown facility. Such a system is used in the Prototype Fast Reactor now being constructed at Dounreay, Scotland, and is described for example in an article in 'Nuclear Engineering,' Volume 12, No. 132, May, 1967, pages 367–371.

It is an object of the present invention to provide refuelling arrangements more suitable particularly, from both design and cost standpoints, for very large power-producing fast reactors, although the invention is equally applicable to any size of reactor.

According to the present invention, a fast nuclear reactor having its core submerged in a pool of liquid coolant and having a store for supporting both irradiated and unirradiated fuel elements submerged in said pool, is characterized in that said store is annular and is disposed concentrically relative to the reactor core, and in that means are provided for moving fuel elements to said store and from thence to said core, and vice versa.

The said store is preferably rotatable about the axis of said core, and its positions for supporting fuel elements therein are disposed around at least most of its annular extent.

The said store is preferably in lateral register with the core. By this expedient, space requirements otherwise necessary should the store be above or below the core, can be saved.

Where the store is rotatable, there may be first fuel element handling means for loading and unloading said store and disposed at a fixed position relative to the store and able to register with at least one fuel element supporting position thereof, rotation of the store bringing the other fuel element supporting positions progressively into register therewith, and second, separate fuel-handling means for moving fuel elements from said store to said core and vice versa and itself translatable laterally relative to the core axis so as to be made to register in turn with any core position and with any fuel element supporting position of the store.

The expression 'reactor core' employed herein is to be construed as including all or part of a radial breeder blanket or reflector where provided, unless the context directly indicates to the contrary.

The annular store is preferably suspended from a rotary carriage journaled in a fixed structural part of the reactor installation, but it may alternatively by supported by bearings at the lower end or a combination of both top and bottom supports may be used.

The same second fuel element handling means is preferably a transfer machine mounted on a rotatable shield itself mounted eccentrically in or on another rotatable shield disposed concentrically relative to and above the reactor core, the concentric shield having a bearing flange which is eccentrically extended so as to provide a bearing surface for the eccentrically mounted shield carrying the said machine.

The said transfer machine may be adapted to contain liquid coolant so that the operation of transfer of an irradiated fuel element from core to store can be accomplished entirely in liquid coolant.

The said first fuel element handling means is preferably a charge/discharge machine operating, in conjunction with said store, with buckets for containing a liquid coolant medium for a fuel element. Operations involving buckets are described in the said article in 'Nuclear Engineering.'

Figure 2:
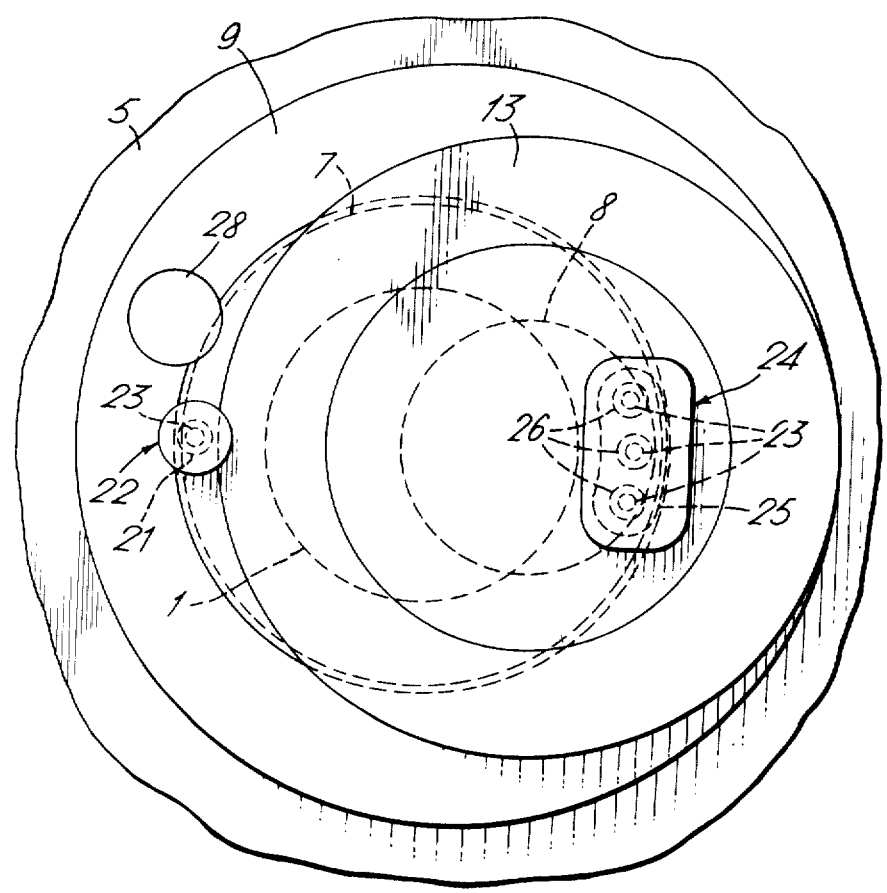

A constructional example embodying the invention will now be described with reference to the accompanying diagrammatic drawings, wherein:

FIG. 1 is a fragmentary side view in medial section of part of a fast nuclear reactor installation, and FIG. 2 is a plan view of FIG. 1.

Referring to the drawings, in the construction of the salient features of a fast nuclear reactor shown diagrammatically therein, we provide a cylindrical fast core region 1 surrounded by a radial breeder blanket region 2 and having above the core region 1 an upper axial breeder blanket region 3 and below the core region 1 a lower axial breeder blanket region (not shown). The said regions are disposed below the surface S of a pool P of liquid metal, e.g., sodium, contained in a vessel (not shown), there being a blanket of pressurized inert gas, e.g., argon, occupying the region 4 above the liquid metal surface. The blanket gas region 4 is bounded at its top by a structural vault roof 5 penetrated by a cylindrical opening 6 mainly closed by rotatable shields 7, 8 respectively. The vessel also contains pumps (not shown) for circulating liquid metal coolant through core and blanket regions to primary heat exchangers (not shown), also within the vessel, by means of which heat generated in the core and blanket regions can be extracted and employed, in secondary heat exchangers outside the vessel, to produce steam for the generation of electric power in turbines.

The shield member 7 has a flange 9 supported on bearings 10 carried in an annular recess 11 in the top of the vault roof 5 and around the opening 6 therein. The bearings 10 support the shield 7 concentrically above the core region 1, but the flange 9 is formed eccentrically in order to provide support for the shield 8, which has a flange 13 carried by the flange 9 through bearings 12 and disposed eccentrically relative to the axis of core region 1, the shield 8 thus penetrating the shield 7 eccentrically. Dip seals 14 are provided to stop leakage of blanket gas, and any liquid metal vapor which may be entrained therein, to the outside of the vault roof 5.

Also penetrating the opening 6 in the roof 5 is an annular support sleeve 15 carrying at its lower end an annular store 16 which surrounds the core and blanket regions and is below the surface S of the liquid metal pool P. The sleeve 15 is disposed around the shield 7 and has seals 17 between it and the shield 7 and between it and the wall of the opening 6, for the same purpose as the seals 14. The sleeve 15 has a flange 18 at its upper end which forms a carriage from which the store 16 is supported for rotation, concentrically relative to the axis of the core region 1, by bearings 19 provided in the recess 11 of the roof 5. A cylindrical thermal shield 20 surrounds the store and serves to thermally insulate the core, blanket and storage regions from the remainder of the liquid metal pool P.

The shield 7 is penetrated by a tubular extension 21 of a first fuel element handling means constituted by a charge/discharge machine 22 carried on the flange 9 of the shield 7. The lower end of the tubular extension 21 is disposed below the surface S of the liquid metal pool P and can register with each (in turn) of a plurality of sockets (four only being shown in FIG. 2 in dotted lines and designated 23) provided concentrically all round and in the store 16 for the reception and support of buckets (not shown) for fuel subassemblies from the core and radial blanket regions. The machine 22 can raise a bucket, containing and supporting a fuel subassembly in liquid metal, from the store 16 and pass it to a transfer flask (not shown) for lateral transfer of the fuel subassembly to a breakdown facility remote from the reactor. New fuel subassemblies each in a bucket can be brought into the reactor by the reverse route, and left in the annular store 16 until required to be transferred to the core or radial blanket regions. The feed to and withdrawal from the store 16 can be performed while the reactor is at power, with the shield 7 stationary and the store 16 rotated as required.

The flange 13 of the shield 8 carries a second fuel-element handling means constituted by a transfer machine 24 which has a tubular extension 25 extending downwardly through the shield 8 with its lower end disposed beneath the surface S of the liquid metal pool P. As shown in FIG. 2, the tubular extension contains three transfer tubes 26 which can register, in one angular position of the shield 8, with these sockets of the store 16, and, on relative rotation of the shields 7 and 8, can also be made to register with any core or radial blanket position, enabling fuel subassemblies to be removed from transfer buckets in the sockets 23 of the store 16 and placed in any selected core or radial blanket position, and vice versa. To enable transfer to take place entirely beneath liquid metal, the machine 24 has provision for venting the pressurized inert gas (part of the gas blanket) contained in it to atmosphere or to a storage vessel (with safeguards in case said gas should be radioactive), the consequent removal of gas pressure causing liquid metal to be forced into the machine to a sufficient level to enable fuel transfer to be carried out in liquid metal throughout.

For the reasons stated in the opening paragraphs hereof, and also because control rod mechanisms 27 provided on the flange 13 of the shield 8 require to be disconnected from the control rods which they operate on relative rotation of the shields 7 and 8, transfer by machine 24 of fuel between core and blanket regions and the store 16 is only performed while the reactor is shut down, i.e., when the control rods are left inserted in the core and disconnected from the control mechanisms 27.

Provision may be made for inspecting the bearings 19, for example by a normally plugged inspection port 28 in the flange 9.

The annular store is advantageous compared with a storage rotor such as is described in the said article in "Nuclear Engineering," because it requires considerably less room in the reactor vessel than a large storage rotor on an axis separate from and outside the core and blanket regions. It is also advantageous in that it can have fuel transferred to and from it by straight lift rather than having to employ the sideways translation required by the system described in the said article. Furthermore, making the annular store rotatable enables fuel elements to be supplied to and removal from the store without shutting the reactor down, since the ability to rotate the store 16 enables the shield 7 to be kept stationary while ensuring that the charge/discharge machine 22 can service any of the fuel element positions in the store 16. Because the shield 7 is kept stationary, the control mechanisms associated with the shield 8 (which is also kept stationary during reactor operation) can retain their connection with the reactor control rods, and the ability to control the reactor is uninhibited. The presence or absence of fuel elements in the store 16 and any supplying to or removal from the store 16 of fuel elements by the charge/discharge machine 22 will have negligible effect on the reactivity of the core region.

I claim:

1. A fast nuclear reactor comprising a core submerged in a pool of liquid coolant contained in a vessel, an annular store for fuel elements, disposed concentrically relative to said reactor core and submerged in said pool of liquid coolant, said store being in lateral register with the core and being rotatable about the axis of the core, said store having positions for supporting fuel elements therein, said positions being disposed around at least most of its annular extent and fuel element handling means being provided for moving fuel elements to said store and from the store to the core and vice versa, said fuel element handling means including straight lift means for loading and unloading said store and disposed at a position which is fixed relative to said store and able to register with at least one fuel element supporting position thereof, rotation of said store bringing the other fuel element supporting positions progressively into register therewith.

2. A fast nuclear reactor comprising a core submerged in a pool of liquid coolant contained in a vessel, an annular store for fuel elements disposed concentrically relative to said reactor core and submerged in said pool of liquid coolant, said store being in lateral register with the core and being rotatable about the axis of the core, said store having positions for supporting fuel elements therein, said positions being disposed around at least most of its annular extent and fuel element handling means being provided for moving fuel elements to said store and from the store to the core said fuel element handling means comprising first means for loading and unloading said store and disposed at a position which is fixed relative to said store and able to register with at least one fuel element supporting position thereof, rotation of said store bringing the other fuel element supporting positions progressively into register therewith, and further includes second, separate, means for transferring fuel elements from said store to said core and vice versa and itself translatable laterally relative to the axis of said core for being registrable in turn with any core position and any fuel element supporting position of the store.

3. A nuclear reactor according to claim 2, wherein said second means comprises a transfer machine mounted on a rotatable shield itself mounted eccentrically in another rotatable shield disposed concentrically relative to and above the reactor core, and a bearing flange of the concentric shield, said bearing flange being eccentrically extended for providing a bearing surface for the eccentrically mounted shield carrying said transfer machine.

4. A nuclear reactor according to claim 3, wherein said transfer machine has associated with it means for flooding the machine with liquid coolant for enabling transfer of an irradiated fuel element from core to store to be carried out entirely in liquid coolant.

5. A nuclear reactor according to claim 2, wherein said first means is a charge/discharge machine for operating, in conjunction with said store, with buckets for containing a liquid coolant medium for a fuel element.

6. A nuclear reactor according to claim 2, wherein said store is suspended from a rotary carriage journaled in a fixed structural part of the reactor installation.

* * * * *